United States Patent
Yancey, Jr. et al.

(10) Patent No.: US 12,389,890 B2
(45) Date of Patent: Aug. 19, 2025

(54) URCHIN CULLING MECHANISM AND ATTRACTANT METHOD

(71) Applicant: COASTAL WATERS BIOTECHNOLOGY 2, INC., Atlanta, GA (US)

(72) Inventors: Dennis Dwyane Yancey, Jr., Atlanta, GA (US); Arthur McClung, III, Atlanta, GA (US)

(73) Assignee: COASTAL WATERS BIOTECHNOLOGY 2, INC., Atlanta, GA (US)

( * ) Notice: Subject to any disclaimer, the term of this patent is extended or adjusted under 35 U.S.C. 154(b) by 193 days.

(21) Appl. No.: 17/916,089

(22) PCT Filed: Apr. 6, 2021

(86) PCT No.: PCT/US2021/025898
§ 371 (c)(1),
(2) Date: Sep. 30, 2022

(87) PCT Pub. No.: WO2021/207142
PCT Pub. Date: Oct. 14, 2021

(65) Prior Publication Data
US 2023/0143856 A1    May 11, 2023

Related U.S. Application Data

(60) Provisional application No. 63/005,615, filed on Apr. 6, 2020.

(51) Int. Cl.
*A01K 69/06* (2006.01)

(52) U.S. Cl.
CPC .................................. *A01K 69/06* (2013.01)

(58) Field of Classification Search
CPC ....... A01K 69/06; A01K 69/00; A01M 27/00; A01G 33/00
See application file for complete search history.

(56) References Cited

U.S. PATENT DOCUMENTS

| 146,003 | A | * | 12/1873 | Huggins | ............... | A01M 23/36 |
| | | | | | | 43/80 |
| 844,945 | A | * | 2/1907 | Le Beau | ................ | A01K 69/06 |
| | | | | | | 43/100 |

(Continued)

FOREIGN PATENT DOCUMENTS

| EP | 1745693 A1 * | 1/2007 | ............. A01G 33/00 |
| JP | S5586467 U | 6/1980 | |
| JP | 2005073637 A | 3/2005 | |
| JP | 2018174825 A | 11/2018 | |
| KR | 101479264 B1 | 1/2015 | |

OTHER PUBLICATIONS

CN 106577560 and merged English translation (Year: 2017).*

(Continued)

*Primary Examiner* — Peter M Poon
*Assistant Examiner* — Marisa V Conlon
(74) *Attorney, Agent, or Firm* — DLA Piper LLP US

(57) ABSTRACT

Embodiments of the present disclosure relate to a system for attracting and monitoring marine life by capturing images on and around the seafloor surrounding a device of the system. The system can quantitatively measure the effectiveness of attracting and culling marine life such as but not limited to sea urchins. The attracting and the culling features can be used independently.

25 Claims, 11 Drawing Sheets

(56) References Cited

U.S. PATENT DOCUMENTS

| | | | | |
|---|---|---|---|---|
| 5,191,733 | A | * | 3/1993 | Withrow ............... A01M 27/00 43/79 |
| 5,713,303 | A | | 2/1998 | Willinsky et al. |
| 6,119,630 | A | | 9/2000 | Lobsiger et al. |
| 7,512,326 | B1 | | 3/2009 | Eldredge et al. |
| 11,490,572 | B2 | * | 11/2022 | Walker ................... A01G 33/00 |
| 11,785,920 | B2 | * | 10/2023 | Gudesen ................ A01K 61/60 119/239 |
| 2003/0062002 | A1 | | 4/2003 | Byrne et al. |
| 2005/0200699 | A1 | | 9/2005 | Kim |
| 2008/0092431 | A1 | * | 4/2008 | Fritzboger ................ E03F 7/06 43/79 |
| 2013/0109259 | A1 | * | 5/2013 | Abulrassoul ............. B63C 7/26 441/11 |
| 2013/0167428 | A1 | | 7/2013 | Olguin |

OTHER PUBLICATIONS

CN 106614203 and merged English translation (Year: 2017).*
CN 112806293 and merged English translation (Year: 2021).*
KR 101453990 and merged English translation (Year: 2014).*
International Preliminary Report on Patentability issued in International Application No. PCT/US2021/025898, dated Oct. 20, 2022, 7 pages.
International Search Report and Written Opinion issued in International Application No. PCT/US2021/025898, dated Jul. 20, 2021, 7 pages.
Office Action for Canadian Patent Application No. 3173615 mailed on Feb. 19, 2024, 3 pages.
Office Action for Japanese Patent Application No. 2023-504151, mailed Dec. 13, 2024, 15 pages.

* cited by examiner

URCHIN CULLING MECHANISM AND ATTRACTANT METHOD

PRIORITY

This application is a 371 of International Application Number PCT/US2021/025898, filed Apr. 6, 2021, which claims the benefit of U.S. Provisional Patent Application No. 63/005,615, filed Apr. 6, 2020, which are incorporated by reference in their entireties.

BACKGROUND

Urchin barrens form in the shallow part of oceans where sea urchin populations have proliferated, leading to overfeeding on kelp forests. Over the past four decades, barrens have been reported along coastlines around the world, everywhere from Nova Scotia to Chile. They can span over a thousand kilometers of coastline or occur in small patches. To assist ocean restoration in urchin barrens, human divers and seafloor traps have been used to cull urchins. However, diving to cull urchins is labor intensive. Counting the number of urchins in a trap after pulling the trap from the seafloor offers little data and cannot provide information about marine life on the ocean floor surrounding the trap.

SUMMARY

There is a need for more near real-time data on urchin density that relates to trap engagement and effectiveness. In addition, the general biodiversity data of surrounding plant and animal species could be very beneficial to a variety of stakeholders from marine scientists to government agencies.

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

According to one aspect of the present disclosure, a system for attracting and monitoring marine life, can include: an underwater device, comprising: a weighted base having a top, a bottom, and a side determined by a shape of the weighted base, the weighted base supporting a camera attached to the top of the weighted base; an attractant apparatus suspended above the weighted base and connected to the top of the weighted base by an anchor affixed to a proximate side of the attractant apparatus; a communications enabled buoy suspended above the weighted base and the attractant apparatus and connected to a distal side of the attractant apparatus by a flexible link; a data cable communicatively coupled to the camera and the communications enabled buoy; and a microcontroller communicatively coupled to the data cable and disposed within the communications enabled buoy.

In some embodiments, the attractant apparatus can include: a lure containment object connected to the top of the weighted base by the anchor; and an attractant disposed within the lure containment object. In some embodiments, the attractant apparatus can include: a planter frame having a plurality of slots connected to the top of the weighted base by the anchor; a plurality of seeding plates arranged to fit into the slots of the planter frame; and a center post extending above the planter frame. In some embodiments, the anchor can include a rigid rod between the top of the weighted base and the center of the planter frame. In some embodiments, the system can further include the camera mounted to the center post to monitor the seeding plates. In some embodiments, the flexible link can include a chain, cable, rope, cord, tube, or wire. In some embodiments, the system can further include a culling unit disposed between the weighted base and the attractant apparatus, the culling unit comprising: a motor attached to the top of the weighted base; a threaded center-rod extending above the motor; a shaft coupling terminating the threaded center-rod; a culling plate with culling spikes disposed between the top of the weighted base and the shaft coupling, the culling plate with culling spikes having a top surface and a bottom surface; and a limit switch affixed to the bottom surface of the culling plate with culling spikes. In some embodiments, the culling unit can include: a size exclusion base attached to the top of the weighted base; a motor attached to the attractant apparatus by the anchor; a threaded rod extending below the motor; an extrusion basket containing an attractant reservoir moving along the threaded rod; and an attractant disposed within the attractant reservoir. In some embodiments, the system can further include a mounting cage holding the motor in place. In some embodiments, the anchor can include a flexible chain, cable, rope, cord, tube, or wire. In some embodiments, the camera can be configured to capture images of marine life on and around the weighted base in near real-time. In some embodiments, the data cable connected to the camera can be configured, by the microcontroller, for a wireless communication link to a remote server for executing instructions, monitoring, and data storage. In some embodiments, the microcontroller can be configured to: activate the camera at timed intervals; and activate the motor of the culling unit. In some embodiments, the attractant can include kelp, seaweed, abalone, coral, sea sponges, algae, sea lettuce, or combinations thereof.

According to one aspect of the present disclosure, a method for attracting and monitoring marine life, can include: attracting, by an attractant disposed within an attractant apparatus supported by a weighted base, marine life into an entrapment zone; capturing, by one or more cameras supported by the weighted base and operably linked to a data cable, an image on and around the weighted base; processing, by a computer vision algorithm, the images to identify the density of marine life in the entrapment zone in near real-time; and transmitting, by a microcontroller, the image to a remote server over the data cable.

In some embodiments, the method can further include culling, by a culling unit having a motor, a threaded center-rod, and a culling plate with culling spikes, marine life in the entrapment zone. In some embodiments, the method can further include culling, by a culling unit having the motor, a threaded center-rod, an extrusion basket, and a size exclusion basket, marine life in the entrapment zone. In some embodiments, the method can further include determining, by the microcontroller, a culling rate of marine life in the entrapment zone. In some embodiments, the attractant apparatus can include a planter frame with a plurality of removable seeding plates, the seeding plates providing a renewable source of the attractant. In some embodiments, the attractant can include kelp, seaweed, abalone, coral, sea sponges, algae, sea lettuce, or combinations thereof.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

Figure 1:
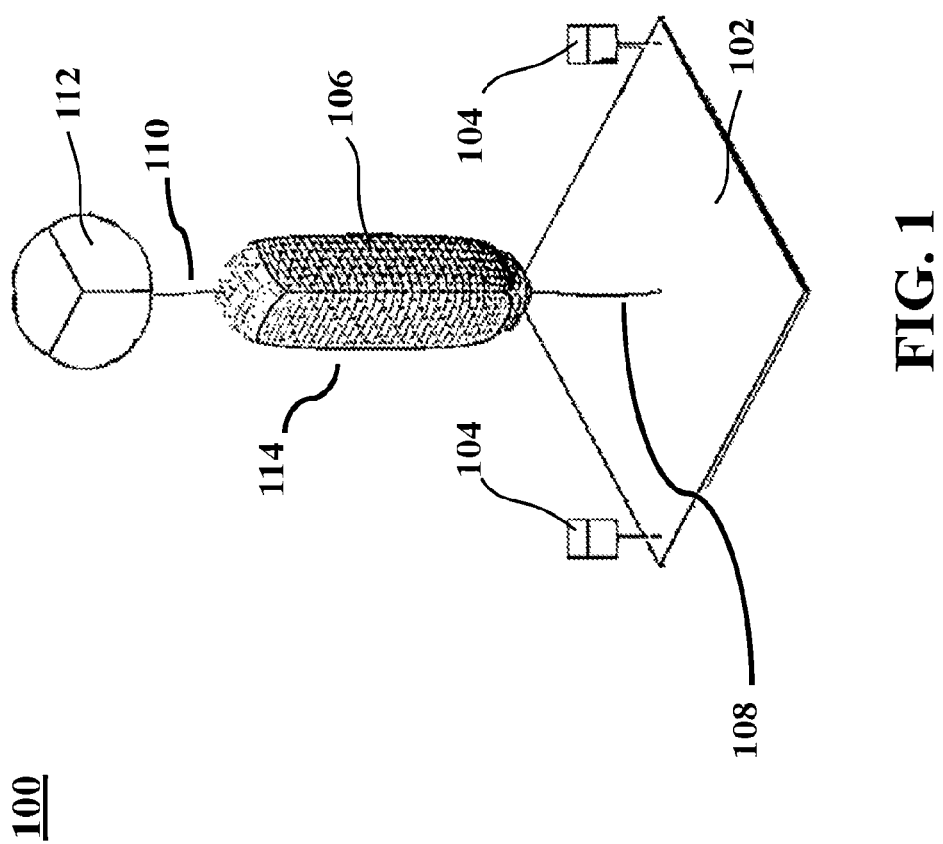
FIG. 1 illustrates a perspective view of a system for attracting and monitoring marine life according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

The following detailed description is merely exemplary in nature and is not intended to limit the invention or the applications of its use.

The terminology used in the present disclosure is for the purpose of describing particular exemplary embodiments only and is not intended to be limiting. As used in the description of the embodiments of the disclosure and the appended claims, the singular forms "a," "an," and "the" are intended to include the plural forms as well, unless the context clearly indicates otherwise.

The term "and/or," as used herein, refers to and encompasses any and all possible combinations of one or more of the associated listed items.

Embodiments of the present disclosure relate to a system for attracting and monitoring marine life by capturing images on and around the seafloor surrounding a device of the system. The system can quantitatively measure the effectiveness of attracting and culling marine life, such as, but not limited to sea urchins of various size and species, lionfish, European green crabs, sea stars, and starfish which threaten coral and rocky reefs. The attracting and the culling features can be used independently.

Sea urchins from the phylum Echinodermata are formed with a domed back side generally referred to as the posterior side and a flattened mouth side generally referred to as the anterior side. The sea urchin has spines covering all of its shell. However, the spines are shorter and more uniform in size on the mouth side. A variety of sea urchin species share these characteristics, though some species do not.

There are approximately 1,000 known species of urchin including green, red, and purple urchins. Green sea urchins are generally found in latitudes above 40° north and below 40° south in all oceans. In North America they are commonly found from Atlantic Canada to Cape Cod on the Atlantic coast and from the Aleutian Islands to British Columbia on the Pacific Coast. The commercial size of green sea urchins generally ranges from 1½ to 4½ inches (3.8 to 11.4 cm) in diameter with spine lengths up to ½ an inch (1.3 cm).

Red sea urchins are commonly found from Juneau, Alaska to Mexico on the Pacific Coast. Red sea urchins are roughly double the size of the green sea urchin varieties and have longer spines, for example up to several inches (7.6 cm) in length. Purple sea urchins occur in the region of overlap of red and green sea urchins on the Pacific Coast. Purple sea urchins are approximately the same size as the green sea urchins.

Lionfish, *Pterois volitans* or red lionfish and *Pterois miles* or devil firefish, are originally from the Indo-Pacific. However, lionfish have been introduced off the coast of South Florida and have since become one of the most prolific invasive marine species in the world. Dense lionfish populations can consume up to 460,000 prey fish per acre per year. With no natural predators in the invaded range and very high breeding rates lionfish pose a significant threat to native fish in the Western Atlantic, Caribbean and Gulf of Mexico.

The European green crab (*Carcinus maenas*) is an invasive species that threatens native species and eelgrass habitats. Their diverse diet, tolerance of a large range of ocean temperatures, and long larval period makes them excellent at conquering new environments. Green crabs are generally regarded as one of the top five most invasive species in the marine environment.

Starfish or sea stars are star-shaped echinoderms belonging to the class Asteroidea. Common usage frequently finds these names being also applied to ophiuroids, which are referred to as brittle stars or basket stars. Starfish are also known as Asteroids due to being in the class Asteroidea. About 1,500 species of starfish occur on the seabed in all the world's oceans, from the tropics to frigid polar waters. They are found from the intertidal zone down to abyssal depths, 6,000 m (20,000 ft) below the surface.

Some sea stars are invasive. For example, the Northern Pacific sea star, also known as *Asterias amurensis* and Japanese common starfish. This species has been introduced to oceanic areas of southern Australia, and is an invasive species there causing damage to native species, especially in Tasmania.

Crown-of-thorns starfish (COTS) (*Acanthaster planci*) are a naturally occurring corallivore (i.e., they eat coral polyps) on coral reefs. Covered in long poisonous spines, they range in color from purplish blue to reddish-gray to green. They are generally 25-35 cm in diameter, although they can be as large as 80 cm.

Crown-of-thorns starfish are found throughout the Indo-Pacific region, occurring from the Red Sea and coast of East Africa, across the Pacific and Indian Oceans, to the west coast of Central America. Predators of COTS include the giant triton snail (*Charonia tritonis*), the stars and stripes pufferfish (*Arothron hispidus*), the titan triggerfish (*Balistoides viridescens*), and the humphead maori wrasse (*Cheilinus undulates*).

For example, the current applications of urchin trapping involve both passive and active means. Passive urchin trapping can be done by cages and flexible nets. Most passive methods involve some type of bait, which is usually some type of desirable fish or fauna (e.g., kelp). The passive traps usually involve a flexible net that is attached to a solid structural weighted component. The passive traps are placed on the seafloor, and once the urchins are in the entrapment zone, the structure can be raised to the surface and emptied. Passive urchin trapping, however, is manual and laborious.

Active urchin trapping is either done via automated (varying degrees of technological tools) or manual (divers) means. There are limited automated tools at this time to assist with urchin collection. There are some remote operated vehicles (ROVs) that can collect urchin, but they often involve significant human interaction (e.g., Seabed Harvester). These vehicles and tools often require the use of divers to operate properly. Divers (both SCUBA and free-dive) also serve as a direct method of manual urchin collection. Divers can use base hands, special gloves or custom tools to assist in the collection of urchin.

Urchin culling is often done by the same persons conducting urchin harvesting, namely human divers. These divers use manual tools such as hammers, spears and custom arm claw accessories to cull and retrieve targeted urchin. It is a largely manual process and not a good solution to address targeted urchin barrens on a global scale. Furthermore, passive methods involve very sporadic data on effectiveness. The state of urchin density can be assessed at the time the trap is placed, and then again when it is checked or collected. The intermediate state of the urchin density and activity is not available.

Like the passive methods, the active methods are sporadic and based on the observation of the divers before, during and after dives, by dive cameras or other counting means. There is a need for a system that is easily deployable and requires less human interaction to cull urchin.

Accordingly, embodiments of the present disclosure are directed to a device that can monitor the sea floor while attracting marine life for data collection and or culling purposes while also reducing the number of times a diver has to manually tend to an underwater trap. Embodiments of the present disclosure assist in monitoring the sea floor and urchin barrens remotely without the need for frequent dives. Furthermore, embodiments of the present disclosure are directed toward coupling a system for attracting and monitoring marine life with methods of transmitting near real-time data on urchin density and ocean biodiversity, culling marine life at intervals determined by processor analysis of camera data, and aquaculture.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

FIG. 1 is a perspective view of a system for attracting and monitoring marine life according to some embodiments of the present disclosure. Marine life, including sea urchin, are encouraged to move toward the base plate by an attractant, and the marine life or urchin density can be monitored by a camera system. A buoy can lift the system toward the surface.

In some embodiments, the system 100 of FIG. 1 can include a weighted base 102, an attractant apparatus 106, an anchor 108, a flexible link 110, a communications enabled buoy 112, and a camera 104. In some embodiments, the attractant apparatus 106 can be a lure containment object 114 as depicted in FIG. 1. In some embodiments, the weighted base 102 can sit on the seafloor and be a basic flat metal plate. In some embodiments, the weighted base 102 can be, for example, a round shape such as a circle, oval, or cloud. In some embodiments, the weighted base 102 can also be a polygon including, but not limited to, a triangle, a rectangle, or a pentagon. In some embodiments, the weighted base 102 can have a top, a bottom, and a number of sides depending on the shape of the weighted base 102. For example, in some embodiments, the weighted base 102 can be a rectangle with four sides. The surface area of the top of the weighted base 102 can be equal to the surface area of the bottom of the weighted base 102 and both can exceed the surface area of the one or more sides. In some embodiments, one or more of the camera 104 can be mounted to the weighted base 102 and directed to capture urchin and biodiversity around the base, over time. The camera 104 can be a digital camera, an underwater camera, a time-lapse camera, or another camera enclosed in waterproof casing. For example, FIG. 1 depicts two of the cameras 104.

In some embodiments the weighted base 102 can be connected to the attractant apparatus 106 by an anchor 108 affixed to a proximate side of the attractant apparatus 106. In some embodiments, the anchor 108 can be a flexible chain, cable, rope, cord, tube, or wire. The anchor 108 can be made of rope, steel, metal, plastic, chain, rubber, or any other suitable material.

In some embodiments, the attractant apparatus 106 shown in FIG. 1 can be a lure containment object 114. In some embodiments, the lure containment object 114 can be an open mesh flexible bag that can contain an attractant (not shown) and the mesh can allow the attractant chemicals, fragrance, and or odorants to disperse in the surrounding area. As used herein, the term "attractant" refers to a natural or synthetic substance that lures marine life. In some embodiments, the attractant can be, for example, kelp, seaweed, abalone, coral, sea sponges, algae, sea lettuce, or combinations thereof. In some embodiments, the lure containment object 114 can be connected to the top of the weighted base 102 by the anchor 108. In some embodiments, the distal end of the attractant apparatus 106 can be connected to the communications enabled buoy 112 by a flexible link 110. In some embodiments, the distal end of the attractant apparatus 106 can be drawn toward the ocean surface by a connection to the communications enabled buoy 112. In some embodiments, the lure containment object 114 can be drawn toward the ocean surface by a connection on the distal end of the lure containment object 114 to the communications enabled buoy 112. In some embodiments, the flexible link 110 can be a flexible chain, cable, rope, cord, tube, or wire. The flexible link 110 can be made of rope, steel, metal, plastic, chain, rubber, or any other suitable material.

As described, the communications enabled buoy 112 can be suspended above the weighted base 102 and the attractant apparatus 106 and can be connected to the distal side of the attractant apparatus 106 by a flexible link 110. In some embodiments, the communications enabled buoy 112 can be installed so that the body frame floats in a balanced manner on the surface of the sea water. In some embodiments, the communications enabled buoy 112 can be installed so that it is completely submerged underwater, while also keeping other elements of the system 100 afloat such as the attractant apparatus 106 and flexible link 110. In some embodiments, the buoy can be a communications enabled buoy 112. In some embodiments, the buoy 112 can include components for transmitting and/or receiving data, such as images and operational commands. The communications enabled buoy 112 may include, for example, a modem for modulating and demodulating signals, and an antenna configured to transmit modulated signals to and/or receive modulated signals from, one or more gateways. Such data signals may be communicated via a radio frequency network. For example, the data signals can be communicated over a cellular network, such as a Global System for Mobile (GSM) communication network, a General Packet Radio Service (GPRS) network, a Code Division Multiple Access (CDMA) network, an Enhanced Data for Global Evolution (EDGE) network, a Long Term Evolution (LTE) network, or any other type of cellular network. In some embodiments the data communications can be over a satellite network. In some embodiments the data communications can be over a shorter distance network, such as a Wi-Fi, Bluetooth, or infrared network. In some embodiments, the communications enabled buoy 112 can be configured to send and/or receive data communications using Long Range (LoRa) or LoRaWAN technology. By using LoRA or LoRaWAN technology, data may be communicated long distances, such as 30 kilometers, even in remote locations where cellular network coverage is unreliable or nonexistent. In another embodiment, the data communications can be over an optical network where light is modulated for wireless transmission. In still another embodiment, the communications enabled buoy 112 can be configured to transmit and/or receive data over a variety of networks. For example, the communications enabled buoy 112 could contain elements that could be configured to transmit over one or more different types of cellular networks, satellite networks, short distance networks, LoRa networks, or optical networks, and may select a network technology to use for a data communication based on availability.

Figure 2:
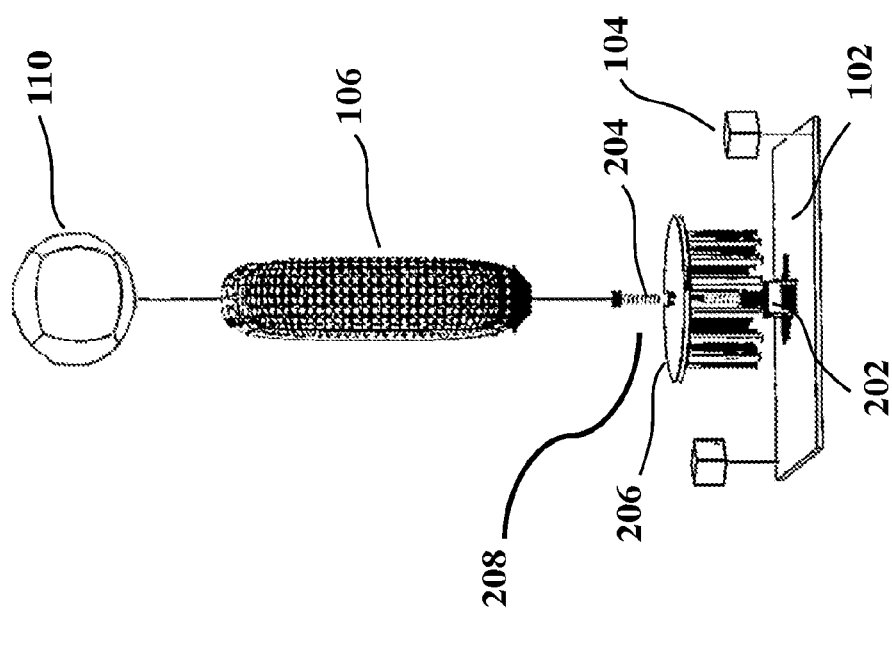
FIG. 2 illustrates another perspective view of a system for attracting and monitoring marine life with a culling unit to eliminate marine life within the entrapment zone according to some embodiments of the present disclosure.

FIG. 2 is another perspective view of a system 200 for attracting and monitoring marine life with a culling unit to eliminate marine life within the entrapment zone, according to some embodiments of the present disclosure. As used herein, the term "entrapment zone" refers to the area circumscribed by a culling unit 208. In some embodiments, the system 200 of FIG. 2 can include the weighted base 102, the camera 104, the attractant apparatus 106, and the communications enabled buoy 112 as described in FIG. 1. Moreover, the system 200 of FIG. 2 can include a culling unit 208. In some embodiments, the culling unit 208 can include a threaded center-rod with shaft coupling 204, a motor 202, and a culling plate with spikes 206. In some embodiments, the system 200 can not only lure marine life to an entrapment zone but can also cull the marine life within a certain range. The marine life in the entrapment zone can be culled periodically, either on timed intervals or upon critical mass of the cull mechanism. In some embodiments, the critical mass culling interval can be determined via analysis of data from the camera 104 system. In some embodiments, the culling unit 208 can be part of a system 200 consisting of the same elements as described in FIG. 1, with the insertion of a culling unit 208 between the weighted base 102 and the attractant apparatus 106.

Figure 3:
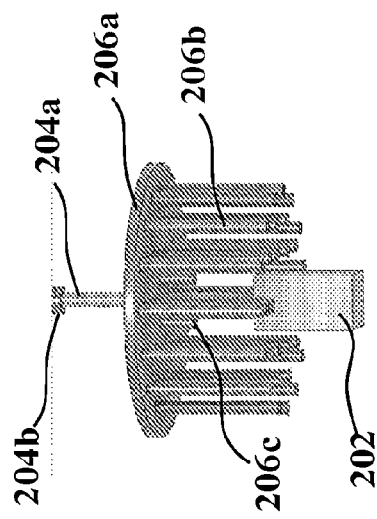
FIG. 3 illustrates a detailed view of a culling unit within the entrapment zone of the weighted base according to some embodiments of the present disclosure.

FIG. 3 is a detailed partial view of a system 300 with the culling unit 208 within the entrapment zone of the weighted base 102 according to some embodiments of the present disclosure. In some embodiments of the system 300, the culling unit 208 can include a motor 202, a threaded center-rod 204a, a shaft coupling 204b, a culling plate 206a with culling spikes 206b, and a limit switch 206c. In some embodiments, the culling unit 208 can cull marine life, such as urchins, by using the motor 202 output to spin the threaded center-rod 204a, thereby moving the plate with culling spikes 206b up and down to periodically target urchin that have been lured to the system. In some embodiments, the motor 202 can be attached to the top of the weighted base 102 as shown in FIG. 2. In some embodiments, the culling spikes 206b can extend from the plate 206a toward the weighted base 102. In some embodiments, the threaded center-rod 204a can terminate into the shaft coupling 204b, which can prevent the remainder of the system above from rotating. In some embodiments, the shaft coupling 204b can be any coupling device used to connect two or more machine shafts for the purpose of transmitting power. In some embodiments, the anchor 108 can extend from the shaft coupling 204b and connect to the proximate end of the attractant apparatus 106. For example, a flexible chain can connect the top of the culling unit 208 of FIGS. 2-3 to the bottom of the lure containment object 114 of FIG. 1.

In some embodiments, the plate with culling spikes 206 can be threaded through the threaded center-rod 204a. As the culling plate 206a and culling spikes 206b are lowered, the culling spikes 206b can penetrate the urchin within the entrapment zone, as these are sandwiched between the culling spikes 206b and the weighted base 102, thus killing them. When the culling plate and spikes are raised, the culled urchin and remains can be released, to be washed away by water currents. In another embodiment, the culling unit 208 can be used to cull other marine life such as starfish or sea sponges.

In some embodiments, the culling unit 208 motion can be initiated by a timed clock interval and prescribed to stop by a similar time interval or the limit switch 206c, which can be attached to the bottom surface of the plate with culling spikes 206. For example, the culling can occur every 1, 5, 10, 15, 20, 30, 45, or 60 minutes. In some embodiments, the culling can occur every 1, 2, 3, 4, or more hours. In some embodiments, the motion of the culling plate 206a and culling spikes 206b can cause the limit switch 206c to trigger the completion of the culling action and to reset to default position.

Figure 4:
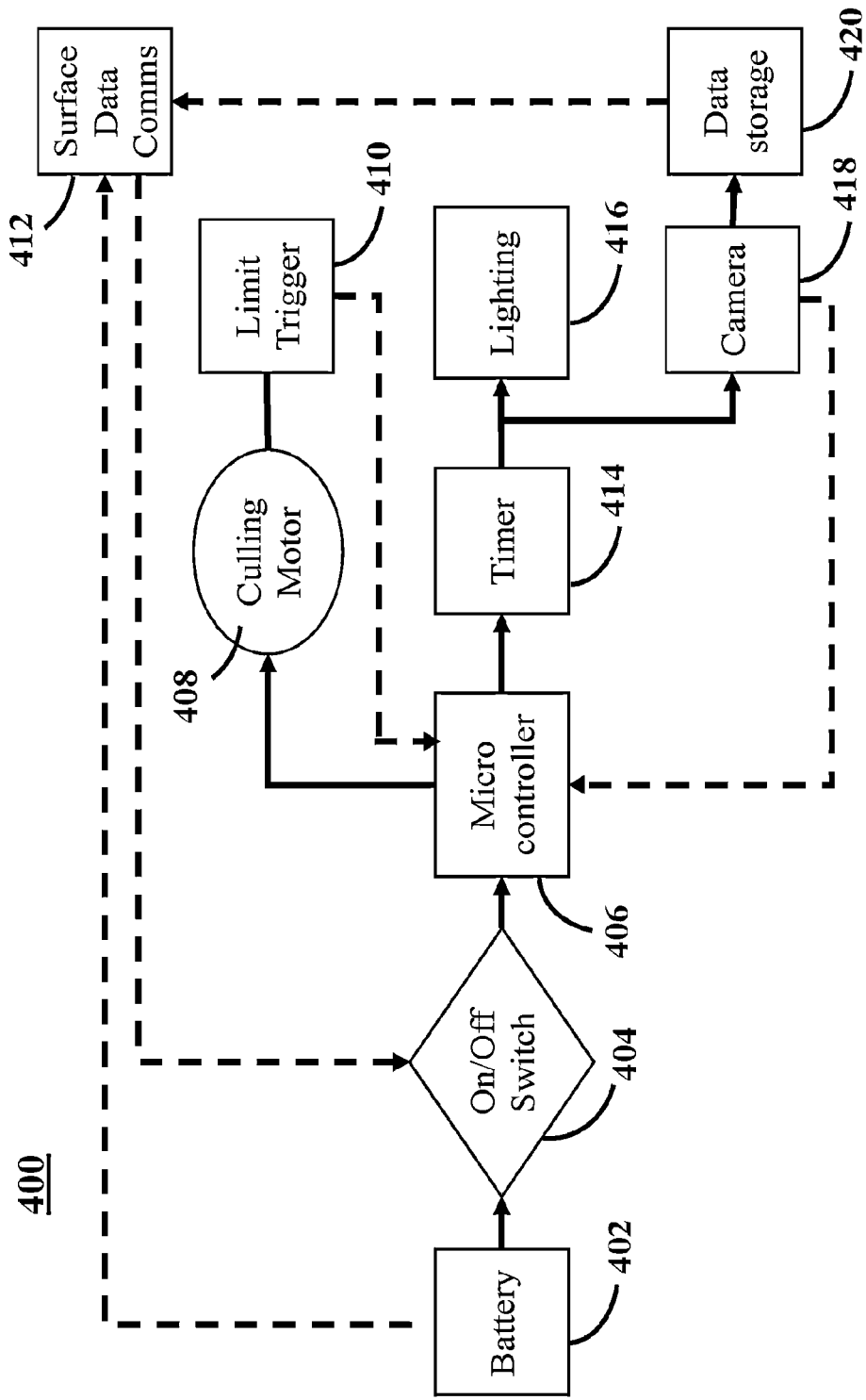
FIG. 4 illustrates a high-level schematic of the system according to some embodiments of the present disclosure.

FIG. 4 is a high-level schematic of the system according to some embodiments of the present disclosure. The schematic depicts an attractant apparatus 106 with the culling unit 208 in place. In some embodiments, such as for the base attractant apparatus depicted in the system 100 as shown in FIG. 1, the motor 202 for culling and limit switch 206c can be absent and not needed in the base attractant apparatus depicted in the system 100.

In FIG. 4, a standard ON/OFF switch 404 controls the entire system 400 operation.

A battery 402 provides the necessary power at scheduled intervals when the system 400 is active. The battery may be, for example, a lithium ion battery, a nickel metal hydride (NiMH) battery, an alkaline battery, or a lead acid battery, though the disclosure is not so limited. In some embodiments, the system can remain in a low power mode for the majority of its operation. Through the use of a timer 414, the system microcontroller 406 can activate the imaging system and culling unit 208 if needed. In some embodiments, the microcontroller 406 can execute instructions for operating the camera 104. In some embodiments, the microcontroller 406 can execute instructions for using computer vision algorithms that can be trained to identify targets of interest in the collected image data from the camera 104 and to control the culling unit 208. In some embodiments, computer vision algorithms can be trained to identify marine life, such as sea urchins, starfish, abalone, or kelp. In some embodiments, computer vision algorithms can analyze image data and can count marine life in the images. In some embodiments, the imaging system can include lighting 416, a camera 418/104 and data storage 420, such as image storage. In some embodiments, when activated, the culling motor 408 can either raise or loser the culling plate and spikes 206. In some embodiments a limit switch, also called a limit trigger, 410 can be used to bound the motion of the culling unit 208 motor 202. In some embodiments, surface data communications 412 can be used to collect stored image data, monitor the battery level and control the system 400.

In an embodiment, a data cable (not pictured) can be connected to the camera 408/104 and communicatively linked to the communications enabled buoy 112, such as that pictured in FIG. 2. In some embodiments, a microcontroller 406 can be connected to the data cable and disposed within a communications enabled buoy 112, such as that pictured in FIG. 2.

In some embodiments, the data cable (not pictured) from the camera system to the communications enabled buoy 112 can provide the ability for a wireless (e.g. cellular) surface data communications 412 to a remote server for monitoring and data storage/backup. In some embodiments, the microcontroller 406 can communicate with the camera 104 subsystem and can transmit and or receive data to the communications enabled buoy 112 via the data cable (not pictured). The movement of the urchin or marine biodiversity data can be collected. In some embodiments, the culling unit 208 motion can be based on insight gained from processing the camera 104 data. In some embodiments, the culling unit 208 motion can be a culling rate. In some embodiments, the culling rate can be determined by the limit switch 410. In some embodiments, the culling rate can be determined by processing camera 104 data. For example, in some embodiments, the culling unit 208 can be deployed when 5, 10, 20, 30, or more marine creatures are within the entrapment zone. In some embodiments, the culling unit 208 can be deployed when the density of the marine life in the entrapment zone is determined by the camera 104, computer vision algorithm, and or microcontroller 406 to exceed a threshold.

In some embodiments, surface data communications 412 may include one or more wide areas networks (WANs), metropolitan area networks (MANs), local area networks (LANs), personal area networks (PANs), or any combination of these networks. The surface data communications 412 may include a combination of one or more types of networks, such as Internet, intranet, Ethernet, twisted-pair, coaxial cable, fiber optic, cellular, satellite, IEEE 801.11, terrestrial, and/or other types of wired or wireless networks. The surface data communications 412 can also use standard communication technologies and/or protocols.

Figure 5:
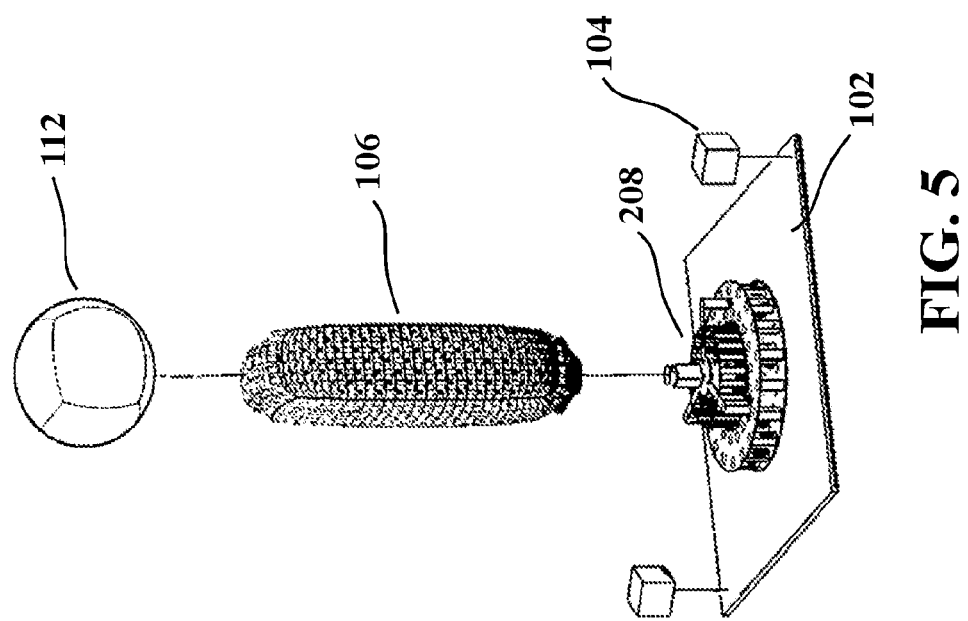
FIG. 5 illustrates another perspective view of a system for attracting and monitoring marine life with another culling unit to eliminate marine life within the entrapment zone according to some embodiments of the present disclosure.

FIG. 5 is another perspective view of a system 500 for attracting and monitoring marine life with another culling unit 208 to eliminate marine life within the entrapment zone according to some embodiments of the present disclosure. FIG. 5 illustrates an embodiment of the attractant system with a weighted base 102, a camera 104, an attractant apparatus 106, a communications enabled buoy 112, and a culling unit 208 with an alternate culling and attractant system to eliminate marine life within the entrapment zone. In some embodiments, the system 500 of FIG. 5 may also be a system as described in any of FIGS. 1-4. In some embodiments, the culling unit 208 of the system 500 can be the culling unit described in FIGS. 2-3.

Figure 6:
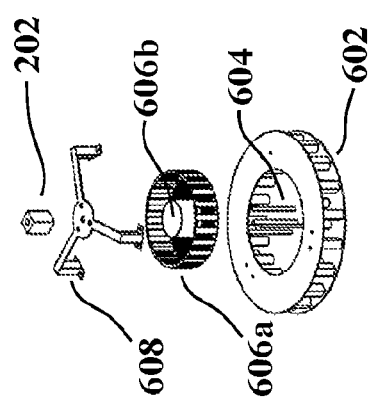
FIG. 6 illustrates an exploded view of another culling unit within the entrapment zone of the weighted base according to some embodiments of the present disclosure.

FIG. 6 is a detailed partial view of a system 600 with culling unit 208 within the entrapment zone of the weighted base 102 according to some embodiments of the present disclosure. In some embodiments, the culling unit 208 shown in FIGS. 5-6, can include a motor 202 and mounting cage 608, an extrusion basket 606a and an attractant reservoir 606b, a size exclusion base 602, and three guide rods 604. In some embodiments, the size exclusion base 602 can be attached to the top of the weighted base 102, and can limit access to the entrapment zone to marine life targets of a certain size. For example, the size exclusion base 602 can be configured to keep marine life larger than urchins out of the entrapment zone. In some embodiments, of the culling unit 208, the extrusion basket 606a and attractant reservoir 606b (e.g., kelp) are a single component mounted on three guide rods 604. In some embodiments, the attractant reservoir 606b can contain kelp. In some embodiments of the culling unit 208, the motor 202 is attached to the attractant apparatus 106 components by the anchor 108 extending from the motor 202 to the proximal end of the attractant apparatus 106. In other words, in some embodiments of the culling unit 208, the motor 202 can be attached to the weighted base 102 and the culling plate with spikes 206 can be attached to the anchor 108. In other embodiments of the culling unit 208, such as depicted in FIGS. 5-6, the motor 202 can be attached to the anchor 108 and the size exclusion base 602 can be attached to the top of the weighted base 102.

In some embodiments, extrusion basket 606a and attractant reservoir 606b component can have a threaded center-rod shaft that allows the extrusion basket and attractant reservoir 606a-b to be lowered to crush the targeted urchin in the entrapment zone and raised to allow the remains to be cleared by water current. In some embodiments, the threaded rod can be driven by a motor 202 which can be held in place by a mounting cage 608. In other words, in some embodiments, the mounting cage 608 can be holding the motor 202 in place. The mechanism can move the extrusion basket and attractant reservoir 606a-b up and down to periodically target urchin that have been lured into the system. In some embodiments, an attractant can be disposed within the attractant reservoir 606b. In another embodiment, of the system 400 of FIG. 4, the motor 202 for culling can be activated to raise or lower the extrusion basket and lure containment 606a-b.

Figure 7B:
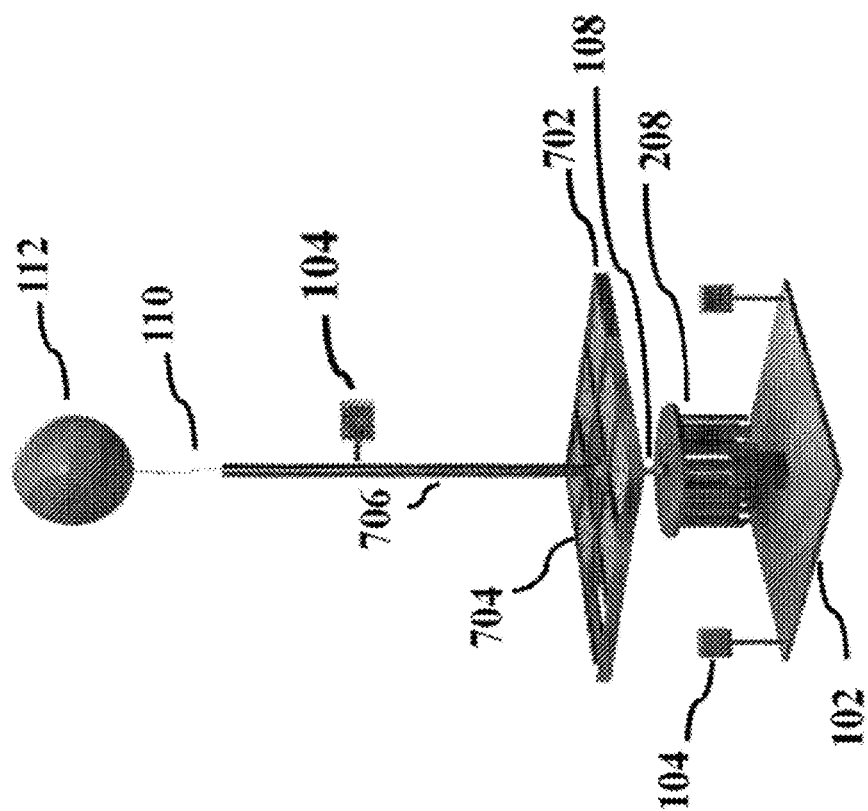
FIG. 7B shows a side view of the attractant apparatus with one seeding plate removed in the planter frame according to some embodiments of the present disclosure.
Figure 7A:
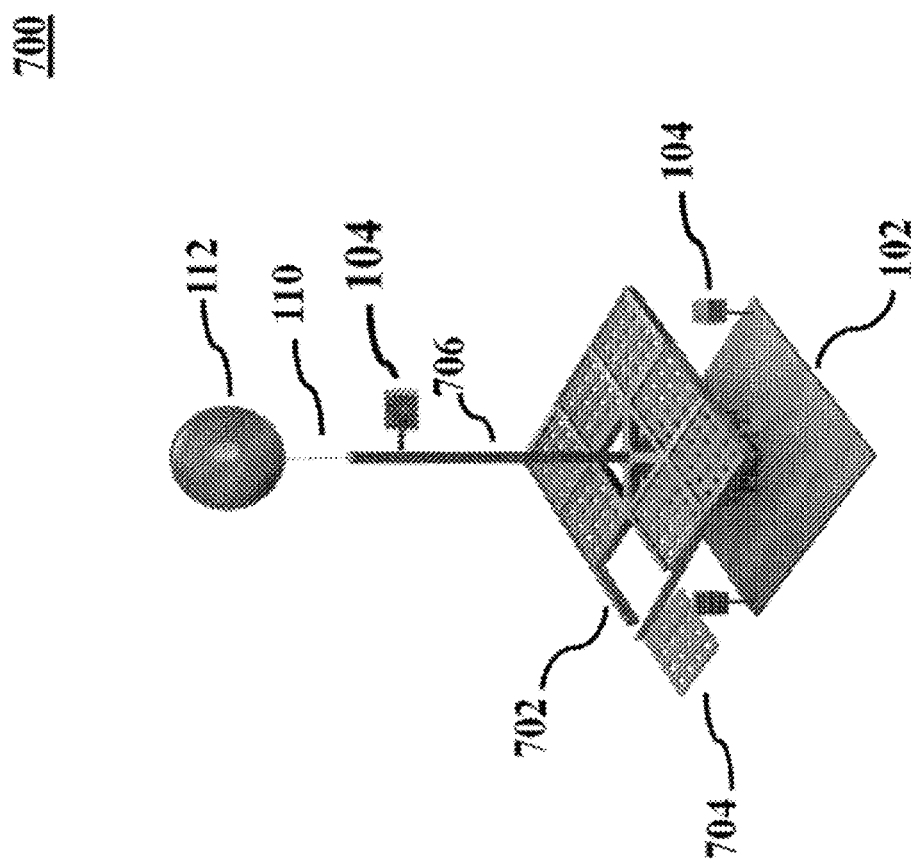
FIG. 7A shows an attractant apparatus with one seeding plate removed from the planter frame according to some embodiments of the present disclosure.

FIG. 7A shows the attractant apparatus system 700 with one seeding plate removed from the planter frame according to some embodiments of the present disclosure. The system 700 includes a weighted base 102, a camera 104, a communications enabled buoy 112, a flexible link 110, a planter frame 702, a plurality of seeding plates 704, and a center post 706 extending above the planter frame 702. In some embodiments, the attractant apparatus 106 can be a planter frame 702, a plurality of seeding plates 704, and a center post 706 extending above the planter frame 702. The planter frame 702 can be connected to the top of the weighted base 102 by the anchor; a plurality of seeding plates 704 can be arranged to fit into the slots of the planter frame 702. In some embodiments, the planter frame 702 can be a lattice, grid, or matrix having 2, 4, 8, 16, 32, 64, 100, 200, or more slots arranged in a repeated pattern. In some embodiments, the seeding plate 704 can have 1, 2, 3, 4, 5, 6, 7, 8, 9, 10, 11, 12, 13, 14, 15, 16, or more holes for aquaculture. In some embodiments, the seeding plate can support kelp holdfasts, which can weave in and out of the holes. The seeding plates can be seeded by submerging in a solution of kelp sporophytes. In some embodiments, the planter frame 702 can be full of seeding plates 704 except for the center space, from where the center post 706 can extend. In some embodiments, the flexible link 110 can connect the communications enabled buoy 112 to the distal end of the attractant apparatus 106. In some embodiments, the distal end of the attractant apparatus 106 can be the top of a lure containment object 114 described in FIG. 1. In some embodiments, the distal end of the attractant apparatus 106 can be a rigid center post 706 extending from the center of the planter frame 702.

FIG. 7B shows a side view of the live kelp embodiment of the attractant apparatus with one seeding plate removed in the planter frame according to some embodiments of the present disclosure. The system 700 includes a weighted base 102, a camera 104, a communications enabled buoy 112, a flexible link 110, an anchor 108, a culling unit 208, a planter frame 702, a plurality of seeding plates 704, and a center post 706 extending above the planter frame 702. In some embodiments, the weighted base 102, camera 104, communications enabled buoy 112, and flexible link 110 can be any of those described in FIGS. 1-6. In some embodiments, the anchor 108 can be a rigid attachment. In some embodiments, the culling unit 208 can be the culling unit 208 described in FIGS. 2-3, 5-6. In some embodiments, the planter frame 702, plurality of seeding plates 704, and center post 706 extending above the planter frame 702 can be those described in FIG. 7A. In some embodiments, more than one of the camera 104 can be in the system. For example, in some embodiments, the camera 104 can be mounted to the weighted base 102 in 1, 2, 3, 4, 5, 6, 7, 8 or more locations. Additionally, in some embodiments, the camera 104 can be mounted to the center post 706 extending about the planter frame 702 with seeding plates 704. In some embodiments, the camera 104 can be mounted to the center post 706 in 1, 2, 3, 4, 5, 6, 7, 8 or more locations. In some embodiments, the camera 104 mounted to the center post 706 can scan for abalone in the kelp fronds, monitor growing kelp, and employ computer vision algorithms to count abalone in the kelp planters. In some embodiments, the computer vision algorithm can be trained to identify, track and count plant and animal species of interest, and can be retrained to improve effectiveness over time as updated system components and training data become available.

Figure 8B:
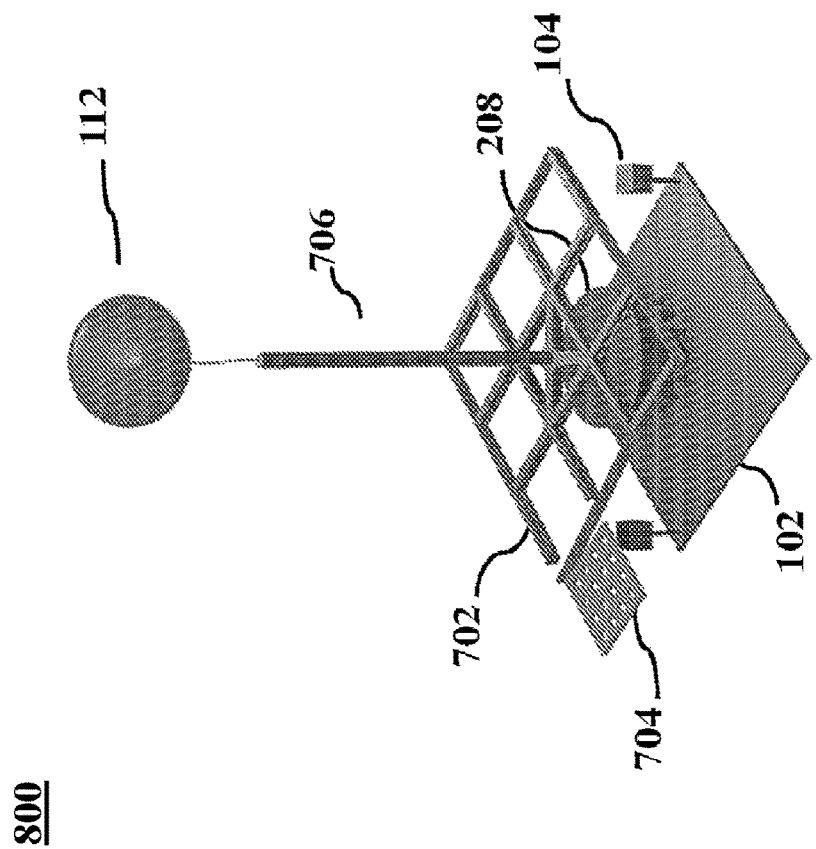
FIG. 8B shows a side view of a planting frame attracting apparatus with the seeding plates removed, but the buoy intact according to some embodiments of the present disclosure.
Figure 8A:
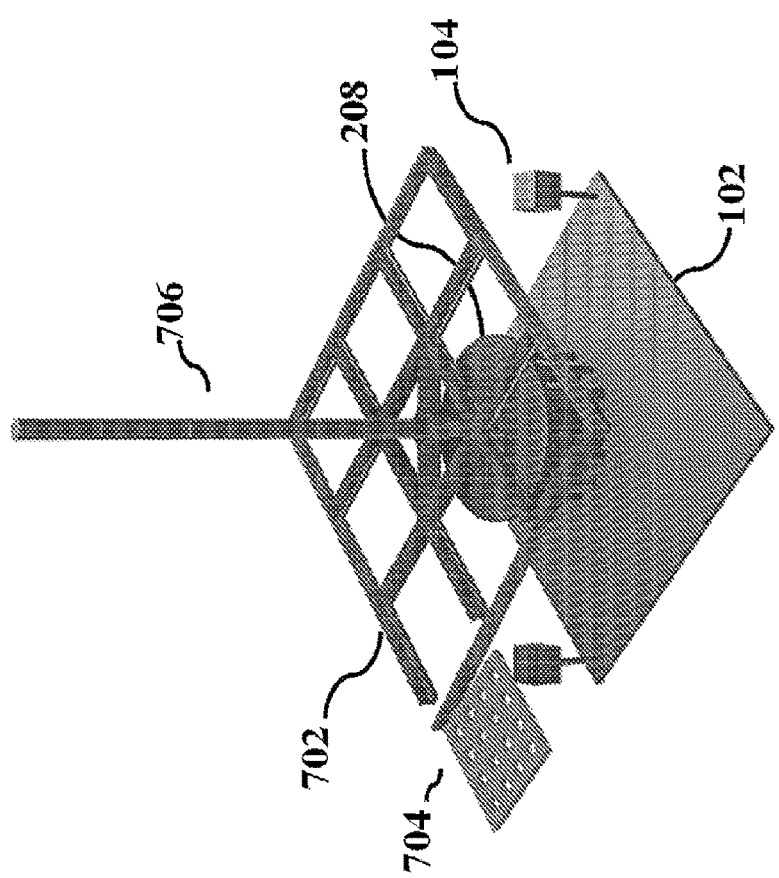
FIG. 8A shows a side view of a planting frame attractant apparatus with the seeding plates and buoy removed according to some embodiments of the present disclosure.

FIG. 8A shows a side view of a planting frame attractant apparatus with the seeding plates and buoy removed according to some embodiments of the present disclosure. The system 800 of FIG. 8A shows a weighted base 102, a camera 104, a culling unit 208, a planter frame 702, a seeding plate 704, and a center post 706 extending above the planter frame 702. In some embodiments, the weighted base 102 and camera 104, can be any of those described in FIGS. 1-6. In some embodiments, the culling unit 208 can be the culling unit 208 described in FIGS. 2-3, 5-6. In some embodiments the planter frame 702, plurality of seeding plates 704, and center post 706 extending above the planter frame 702 can be those described in FIG. 7A.

FIG. 8B shows a side view of a planting frame attracting apparatus with the seeding plates removed, but the buoy intact according to some embodiments of the present disclosure. The system 800 of FIG. 8B shows a weighted base 102, a camera 104, a communications enabled buoy 112, a flexible link 110, an anchor 108, a culling unit 208, a planter frame 702, a seeding plate 704, and a center post 706 extending above the planter frame 702. In some embodiments the weighted base 102, camera 104, communications enabled buoy 112, and flexible link 110 can be any of those described in FIGS. 1-6. In some embodiments the anchor 108 can be a rigid attachment. In some embodiments the culling unit 208 can be the culling unit 208 described in FIGS. 2-3, 5-6. In some embodiments, the planter frame 702, seeding plate 704, and center post 706 extending above the planter frame 702 can be those described in FIG. 7A.

Figure 9:
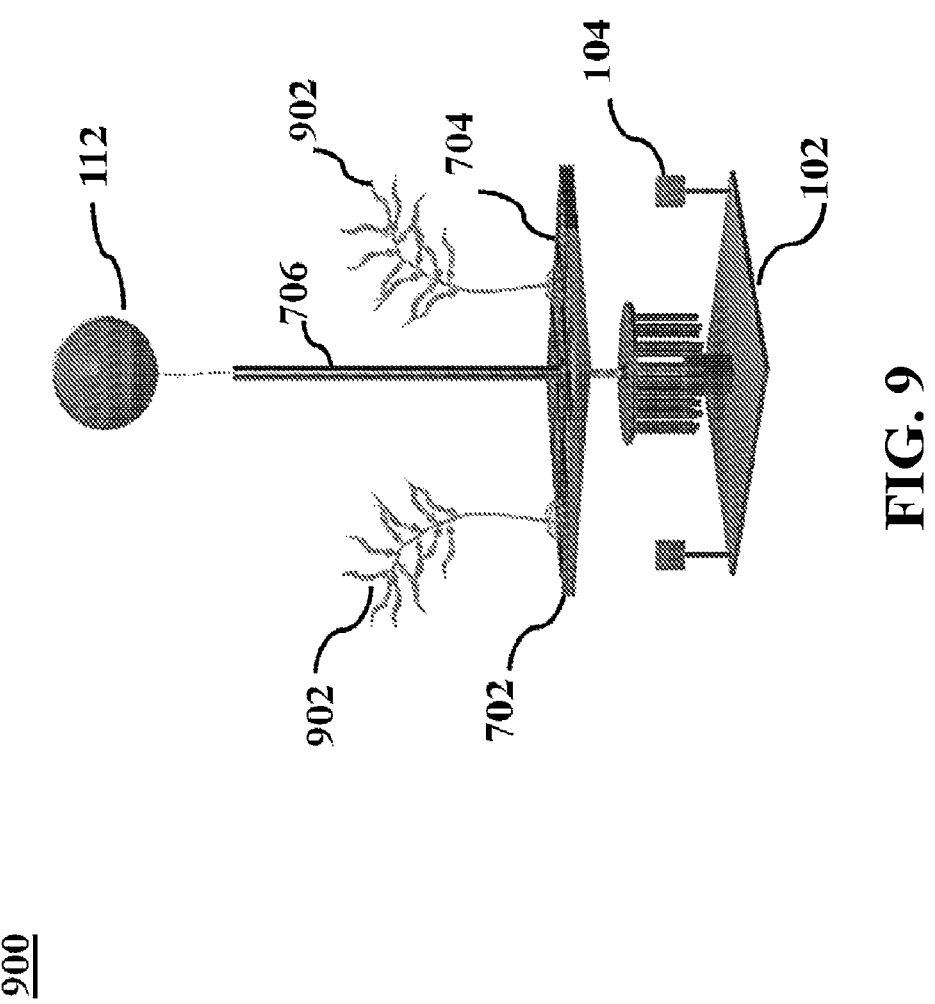
FIG. 9 illustrates a perspective side view of a kelp holdfast growing on an underwater device according to some embodiments of the present disclosure.

FIG. 9 is a perspective side view of a kelp holdfast growing on an underwater device according to some embodiments of the present disclosure. The system 900 of FIG. 9 shows a weighted base 102, a camera 104, a communications enabled buoy 112, a planter frame 702, a plurality of seeding plates 704, kelp 902 growing, and a center post 706 extending above the planter frame 702. In some embodiments the weighted base 102, camera 104, communications enabled buoy 112, and flexible link 110 can be any of those described in FIGS. 1-6. In some embodiments the planter frame 702, plurality of seeding plates 704, and center post 706 extending above the planter frame 702 can be those described in FIG. 7A. In some embodiments, the attractant can be supplied by the attractant apparatus 106 as a renewable source of the attractant. In some embodiments, kelp 902 can grow as the renewable source of the attractant. In some embodiments, the seeding plates 704 can be replaced after transferring the seeding plates with kelp 902 to land-based nurseries. In some embodiments, spores (not pictured) for seeding kelp can be added to the seeding plates 704 in land-based nurseries and then transported to the field such as in the system 900 of FIG. 9. In some embodiments, the plates can be installed, and the juvenile kelp can be allowed to grow in the field.

Figure 10:
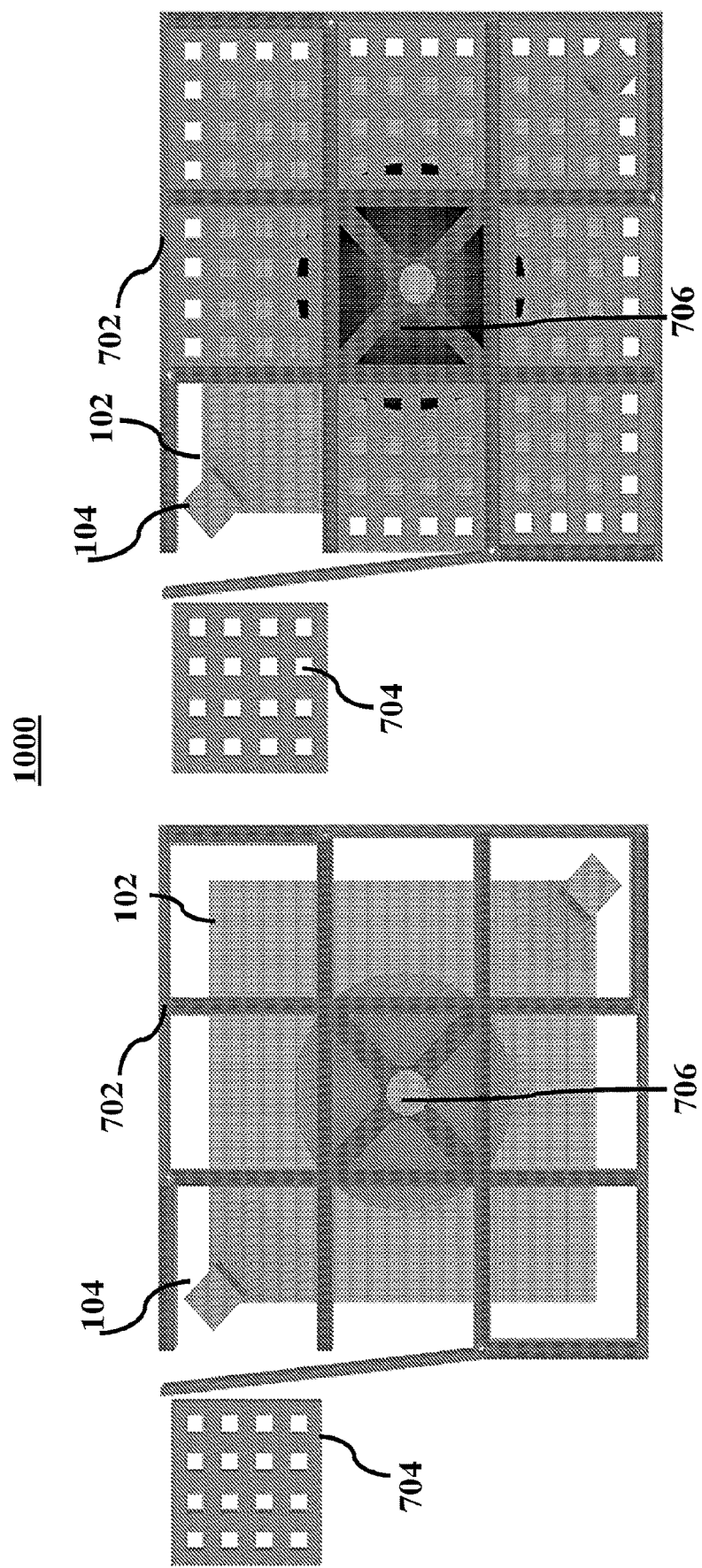
FIG. 10A illustrates a top view of a planting frame without buoy and seeding plates according to some embodiments of the present disclosure.
FIG. 10B illustrates the top view of a planting frame without buoy and with one seeding plate removed according to some embodiments of the present disclosure.

FIG. 10A illustrates the top view of a planting frame without seeding plates according to some embodiments of the present disclosure. The system 1000 of FIG. 10A shows a weighted base 102, a camera 104, a culling unit 208, a planter frame 702, a seeding plate 704, and a center post 706 extending above the planter frame 702. In some embodiments the weighted base 102, camera 104 can be any of those described in FIGS. 1-6. In some embodiments the culling unit 208 can be the culling unit 208 described in FIGS. 2-3, 5-6. In some embodiments the planter frame 702, seeding plate 704, and center post 706 extending above the planter frame 702 can be those described in FIG. 7A. In some embodiments, all of the seeding plates 704 can be removed at once from the planter frame 702.

Figure 11:
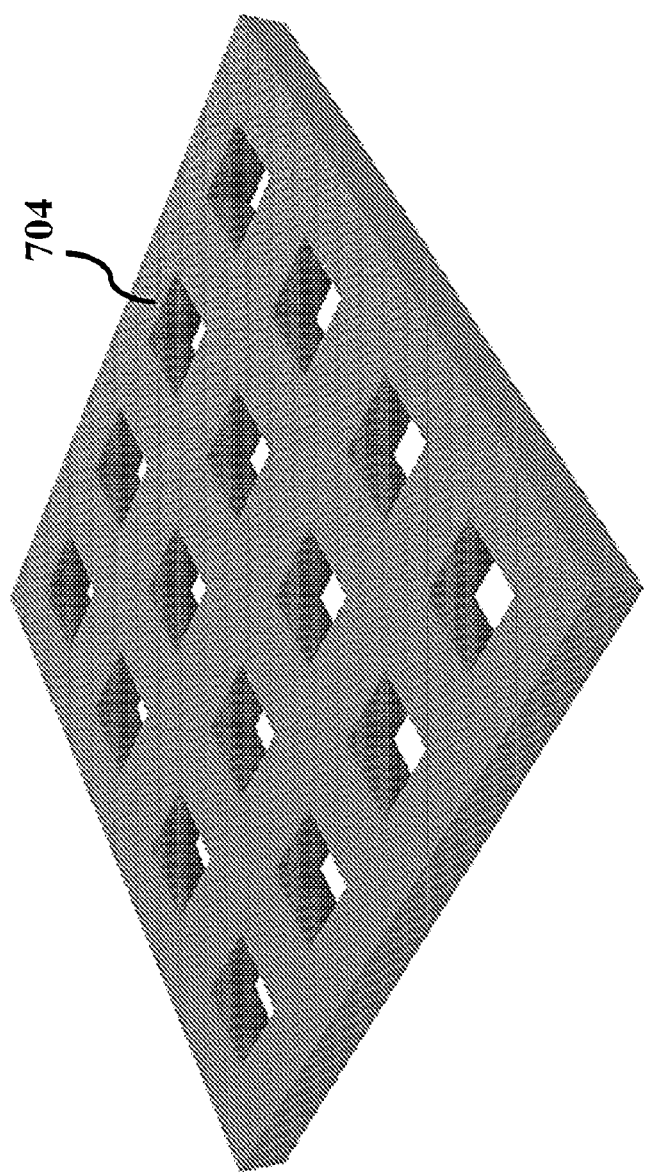
FIG. 11 illustrates a side view of a single seeding plate according to some embodiments of the present disclosure.

FIG. 10B illustrates the top view of a planting frame without buoy and with one seeding plate removed according to some embodiments of the present disclosure. The system 1000 of FIG. 10B shows a weighted base 102, a camera 104, a culling unit 208, a planter frame 702, a plurality of seeding plates 704, and a center post 706 extending above the planter frame 702. In some embodiments the weighted base 102 and camera 104 can be any of those described in FIGS. 1-6. In some embodiments the culling unit 208 can be the culling unit 208 described in FIGS. 2-3, 5-6. In some embodiments the planter frame 702, seeding plate 704, and center post 706 extending above the planter frame 702 can be those described in FIG. 7A FIG. 11 is a side view of a single seeding plate 704 according to some embodiments of the present disclosure.

In some embodiments discussed in FIGS. 1-6, the attractant apparatus 106 can be a lure containment object 114 such as shown in FIG. 1 with the anchor 108, which can be a flexible attachment as discussed, and a communications enabled buoy 112 keeping the lure containment object 114 afloat. In some embodiments discussed in FIGS. 7-11, the attractant apparatus 106 can include a planter frame 702, a plurality of seeding plates 704, and a center post 706 extending above the planter frame 702 such as shown in FIG. 7 with the anchor 108, which can a rigid attachment as discussed, and a communications enabled buoy 112. In some embodiments, the communications enabled buoy 112 does not keep the kelp planter embodiment of the attractant apparatus afloat but can remain for the purposes of communication. In some embodiments, the attractant apparatus 106 can be part of a system without a culling unit 208, such as the system 100 of FIG. 1. In some embodiments, the attractant apparatus 106 can be coupled with a culling unit 208 that operates using a plate with culling spikes 206 to grind target marine life, such as urchin, that have been lured into the entrapment zone such as the culling unit 208 of FIGS. 2-3. In some embodiments, the attractant apparatus 106 can be coupled with a culling unit 208 that operates using an extrusion basket 606a and attractant reservoir 606b to smash target marine life, such as urchin, that have been lured into the entrapment zone such as the system of FIGS. 5-6. In some embodiments, the example system 400 of FIG. 4 can describe any device of the present disclosure, such as the device of FIGS. 1-2, 7-9.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A system for attracting and monitoring marine life, comprising:
   an underwater device, comprising:
   a weighted base having a top, a bottom, and a side determined by a shape of the weighted base, the weighted base supporting a camera attached to the top of the weighted base;
   an attractant apparatus suspended above the weighted base and connected to the top of the weighted base by an anchor affixed to a proximate side of the attractant apparatus;
   a culling unit disposed between the weighted base and the attractant apparatus, the culling unit comprising:
   a motor attached to the top of the weighted base,
   a threaded center-rod extending above the motor,
   a shaft coupling terminating the threaded center-rod, and
   a culling plate with culling spikes disposed between the top of the weighted base and the shaft coupling, the culling plate with culling spikes having a top surface and a bottom surface;
   a communications enabled buoy suspended above the weighted base and the attractant apparatus and connected to a distal side of the attractant apparatus by a flexible link;
   a data cable communicatively coupled to the camera and the communications enabled buoy; and
   a microcontroller communicatively coupled to the data cable and disposed within the communications enabled buoy.

2. The system of claim 1, wherein the attractant apparatus comprises: a lure containment object connected to the top of the weighted base by the anchor; and an attractant disposed within the lure containment object.

3. The system of claim 2, wherein the attractant comprises kelp, seaweed, abalone, coral, sea sponges, algae, sea lettuce, or combinations thereof.

4. The system of claim 1, wherein the attractant apparatus comprises: a planter frame having a plurality of slots connected to the top of the weighted base by the anchor; a plurality of seeding plates arranged to fit into the slots of the planter frame; and a center post extending above the planter frame.

5. The system of claim 4, wherein the anchor comprises a rigid rod between the top of the weighted base and the center of the planter frame.

6. The system of claim 4, further comprising an additional camera mounted to the center post to monitor the seeding plates.

7. The system of claim 1, wherein the flexible link comprises a chain, cable, rope, cord, tube, or wire.

8. The system of claim 1, further comprising: a limit switch affixed to the bottom surface of the culling plate with culling spikes.

9. The system of claim 1, wherein the culling unit comprises: a size exclusion base attached to the top of the weighted base; the motor attached to the attractant apparatus by the anchor; a threaded rod extending below the motor; an extrusion basket containing an attractant reservoir moving along the threaded rod; and an attractant disposed within the attractant reservoir.

10. The system of claim 9, further comprising a mounting cage holding the motor in place.

11. The system of claim 9, wherein the anchor comprises a flexible chain, cable, rope, cord, tube, or wire.

12. The system of claim 9, wherein the microcontroller is configured to:
   activate the camera at timed intervals; and
   activate the motor of the culling unit.

13. The system of claim 9, wherein the attractant comprises kelp, seaweed, abalone, coral, sea sponges, algae, sea lettuce, or combinations thereof.

14. The system of claim 1, wherein the anchor comprises a flexible chain, cable, rope, cord, tube, or wire.

15. The system of claim 1, wherein the camera is configured to capture images of marine life on and around the weighted base in near real-time.

16. The system of claim 1, wherein the data cable connected to the camera is configured, by the microcontroller, for a wireless communication link to a remote server for executing instructions, monitoring, and data storage.

17. The system of claim 1, wherein the microcontroller is configured to:
   activate the camera at timed intervals; and
   activate the motor of the culling unit.

18. A system for attracting and monitoring marine life, comprising:
   an underwater device, comprising:
   a weighted base having a top, a bottom, and a side determined by a shape of the weighted base, the weighted base supporting a camera attached to the top of the weighted base;
   an attractant apparatus suspended above the weighted base and connected to the top of the weighted base by an anchor affixed to a proximate side of the attractant apparatus, wherein the attractant apparatus comprises:
   a planter frame having a plurality of slots connected to the top of the weighted base by the anchor, a plurality of seeding plates arranged to fit into the slots of the planter frame, and
   a center post extending above the planter frame;
   a communications enabled buoy suspended above the weighted base and the attractant apparatus and connected to a distal side of the attractant apparatus by a flexible link;
   a data cable communicatively coupled to the camera and the communications enabled buoy; and
   a microcontroller communicatively coupled to the data cable and disposed within the communications enabled buoy.

19. The system of claim 18, wherein the attractant apparatus comprises:
   a lure containment object connected to the top of the weighted base by the anchor; and
   an attractant disposed within the lure containment object.

20. The system of claim 18, wherein the anchor comprises a rigid rod between the top of the weighted base and the center of the planter frame.

21. The system of claim 18, further comprising an additional camera mounted to the center post to monitor the seeding plates.

22. The system of claim 18, wherein the flexible link comprises a chain, cable, rope, cord, tube, or wire.

23. The system of claim 18, further comprising:
   a culling unit disposed between the weighted base and the attractant apparatus, the culling unit comprising:
   a motor attached to the top of the weighted base,
   a threaded center-rod extending above the motor,
   a shaft coupling terminating the threaded center-rod,
   a culling plate with culling spikes disposed between the top of the weighted base and the shaft coupling, the culling plate with culling spikes having a top surface and a bottom surface, and
   a limit switch affixed to the bottom surface of the culling plate with culling spikes.

24. The system of claim 23, wherein the culling unit further comprises:
   a size exclusion base attached to the top of the weighted base;
   the motor attached to the attractant apparatus by the anchor;
   a threaded rod extending below the motor;
   an extrusion basket containing an attractant reservoir moving along the threaded rod; and
   an attractant disposed within the attractant reservoir.

25. The system of claim 23, wherein the microcontroller is configured to:
   activate the camera at timed intervals; and
   activate the motor of the culling unit.

* * * * *